(12) United States Patent
Hong et al.

(10) Patent No.: US 6,190,604 B1
(45) Date of Patent: Feb. 20, 2001

(54) PROCESS FOR PREPARING A PREFORM WITH HIGH VOLUME FRACTION SIC

(75) Inventors: Soon Hyung Hong, Yooseong-ku; Hyo Soo Lee, Seoul; Kyung Yoon Jeon, Pusan, all of (KR)

(73) Assignee: Korea Advanced Institute of Science and Technology (KR)

( * ) Notice: Under 35 U.S.C. 154(b), the term of this patent shall be extended for 0 days.

(21) Appl. No.: 09/300,122

(22) Filed: Apr. 26, 1999

(30) Foreign Application Priority Data

Apr. 28, 1998 (KR) .................................................. 98-15198

(51) Int. Cl.[7] ....................................................... B28B 3/02

(52) U.S. Cl. ........................................... 264/651; 264/667

(58) Field of Search ..................................... 264/651, 667, 264/669, 670

(56) References Cited

U.S. PATENT DOCUMENTS 5,198,167 * 3/1993 Ohta et al. ............................. 264/86
5,524,697 * 6/1996 Cook ...................................... 164/97

OTHER PUBLICATIONS

Japanese Abstract Publication No. JP403281741 Filter Material For Metallic Molten Metal, Dec. 1991.*

* cited by examiner

Primary Examiner—Christopher A. Fiorilla
(74) Attorney, Agent, or Firm—Pennie & Edmonds LLP

(57) ABSTRACT

The present invention relates to a method of preparing a preform with a high volume fraction of SiC particles. A slurry containing SiC particles and binders is ball-milled and pressed in an apparatus to give a primary preform. This primary preform is dried at room temperature and then, at a high temperature. The dried primary preform is subjected to calcination to prepare the preform. In the apparatus, which comprises a bottom die; a top mold with a cavity, placed on the bottom die, an upper punch for pressing a material for the preform in the cavity; and two water-absorbers, one being inserted between the bottom die and the top mold, the other being placed on the top mold, the slurry is introduced in the cavity and pressed by the punch while the water is absorbed in the absorbers or drained through a gap between the bottom die and the top mold, thereby improving the volume fraction of SiC particles. The preform can be used as a fundamental material in producing metal matrix composites having a high thermal conductivity and a low coefficient of thermal expansion, suitable for the application for, e.g., electronic packaging and space-air structures.

4 Claims, 5 Drawing Sheets

PROCESS FOR PREPARING A PREFORM WITH HIGH VOLUME FRACTION SIC

BACKGROUND OF THE INVENTION

1. Field of the invention

The present invention relates to an apparatus for preparing a preform with a high volume fraction of SiC particles. More particularly, the present invention relates to an apparatus for preparing a preform which is so superior in thermal conductivity and in coefficient of thermal expansion that it can be used as a material for a metal matrix composite useful in electronic packaging and space-air structures. Also, the present invention is concerned with a process for preparing such a preform using the apparatus.

2. Description of the Prior Art

Recently, attention has been paid to metal matrix composites because they are found to be useful as materials not only for electronic packaging, but for space-air structures such as artificial satellites. In a metal matrix composite, the low coefficient of thermal expansion of a ceramic which serves as a reinforcement, restrains the metal matrix from thermally expanding. In addition, preferable coefficients of thermal expansion of a metal matrix composite can be attained by controlling the mole fraction of the reinforcement in the composite. By virtue of these advantages in thermal expansion, metal matrix composites are suitable for use in electronic packaging and space-air structures in which a thermal dimension change is strictly controlled. The reason why the metal matrix composites are of particular interest, also resides in the metal matrix. Metal matrixes have high thermal conductivity, excellent mechanical properties and good processability, which all meet the requirement for the materials for electronic packaging and space-air structures.

In a conventional process for preparing a fiber-reinforced composite, after a slurry of a reinforcement and a binder is mechanically stirred, the medium used is extracted under a vacuum by use of a vacuum assisted extraction method. When a particle-reinforced composite is prepared by the vacuum assisted extraction method, the reinforcement is found to have an average volume fraction of as low as 50%. It is known, however, in order to be used as materials for electronic packaging, metal matrix composites must comprise a reinforcement at a volume fraction of at least 65%.

Noticeable methods for preparing preforms with a high volume fraction of reinforcements are disclosed. For example, WO 96/41030 discloses a preparation method of a preform, which takes a calcining step at 1,700° C. The formation of cuprous oxide which is induced from copper powder under an oxygen or nitrogen atmosphere, is utilized to prepare a preform in U.S. Pat. No. 5,374,391. The method disclosed in U.S. Pat. No. 5,620,511 comprises dispersing silicon micro-particles and carbon fibers in an aluminum alkoxide solution and extracting the solvent under a vacuum. These conventional methods, however, suffer a disadvantage in that they are economically unfavorable because gas atmospheres, high temperatures and expensive large-sized apparatus are needed.

SUMMARY OF THE INVENTION

Therefore, it is an object of the present invention to overcome above problems encountered in prior arts and to provide an apparatus for preparing a preform with a high volume of reinforcements, which can press a preform suspension comprising reinforcements and drain the solvent effectively, thereby improving the volume fraction of the reinforcements in the preform.

It is another object of the present invention to provide a method for preparing such a preform using the apparatus.

In accordance with an aspect of the present invention, there is provided an apparatus for preparing a preform with a high volume fraction of SiC particles, comprising: a bottom die; a top mold with a cavity, placed on the bottom die; an upper punch for pressing a material for the preform in the cavity; and two water-absorbers, one being inserted between the bottom die and the top mold, the other being placed on the top mold, wherein a slurry prepared by mixing SiC particles with binders in deionized water and by ball milling the mixture, is introduced in the cavity and pressed by the punch while the water is absorbed in the absorbers or drained through a gap between the bottom die and the top mold.

In accordance with another aspect of the present invention, there is provided a process for preparing a preform with a high volume fraction of SiC particles by use of the apparatus, comprising the steps of: mixing SiC particles with an inorganic binder, an organic binder and a coagulant in distilled water and ball milling the resulting suspension to give a slurry; pressing the slurry in the apparatus to give a primary preform; drying the primary preform; and calcining the primary preform.

BRIEF DESCRIPTION OF THE DRAWINGS

The above and other objects and aspects of the invention will become apparent from the following description of embodiments with reference to the accompanying drawings in which.

DETAILED DESCRIPTION OF THE INVENTION

The application of the preferred embodiments of the invention is best understood with reference to the accompanying drawings.

Figure 1:
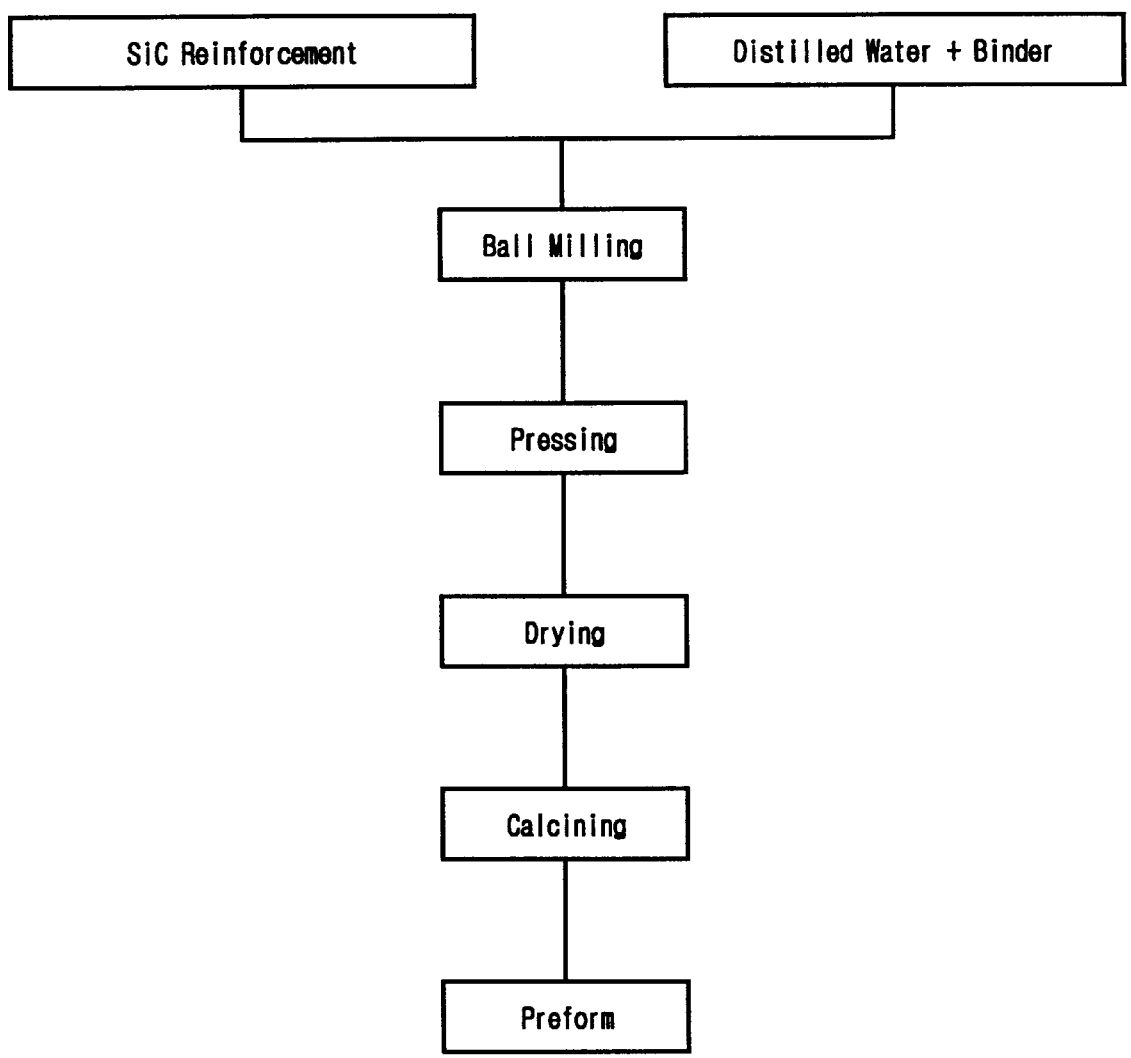
FIG. 1 is a process flow for preparing a preform by a ball milling and pressing method, in accordance with the present invention.

FIG. 1 illustrates the process flow for preparing a preform, according to the present invention. SiC particles are used as a reinforcement. The reinforcement useful in the present invention is a mixture of SiC particles different in size. A proper combination of SiC particles with a diameter of 25–48 $\mu$m and with a diameter of 3–8 $\mu$m brings about an effect of increasing the density of the reinforcement in a matrix. To deionized water, $SiO_2$ as an inorganic binder and cationic starch as an organic binder are added at an amount of approximately 0.1–10% and 0.1–5%, respectively. This slurry is mixed with the SiC particles and added with a trace amount of polyacrylamide which serves as a coagulant. Acetic acid is used to control the pH of the slurry. Account must be taken of the isoelectric points of the added particles as well as the gelation of the inorganic binder in determining the amount of the acetic acid added. The resulting slurried mixture is subjected to ball milling and pressing for 4–12 hours to uniformly disperse the inorganic binder around the SiC particles.

Figure 2A:
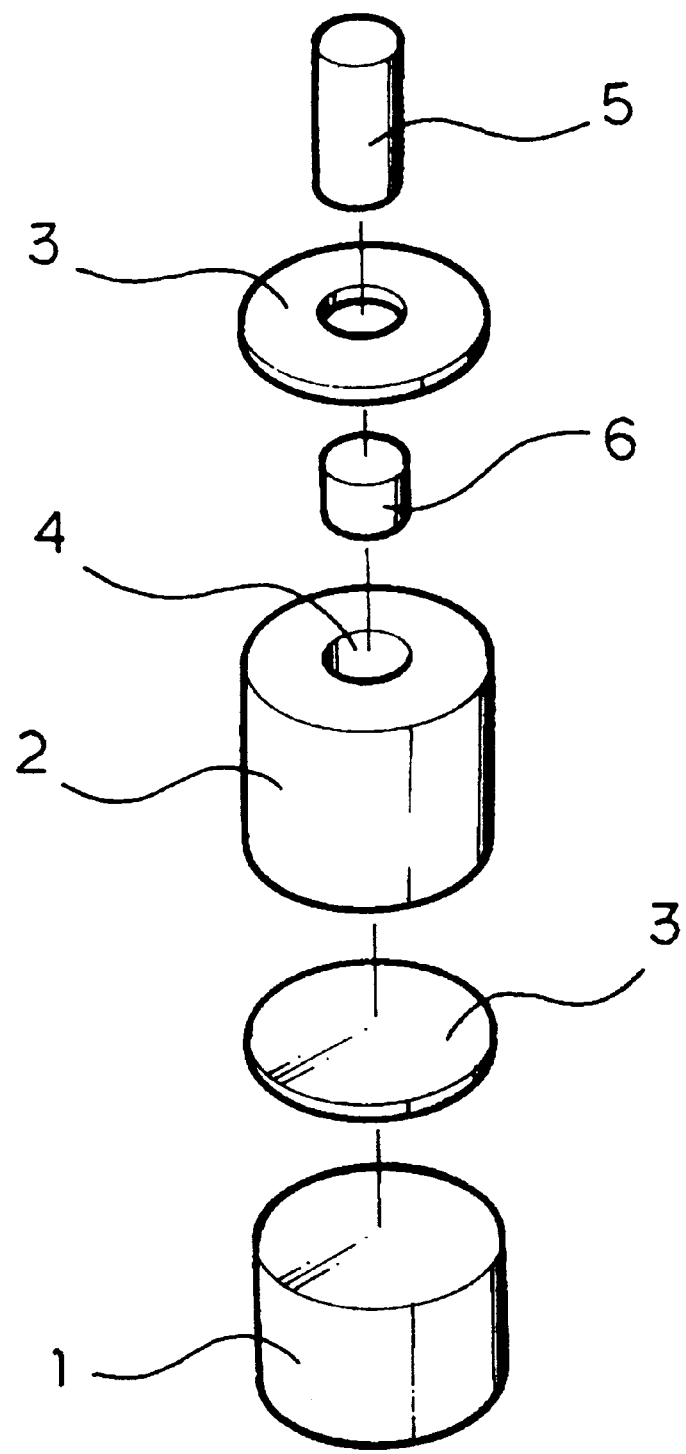
FIG. 2a is an exploded perspective view showing the apparatus of the present invention.
Figure 2B:
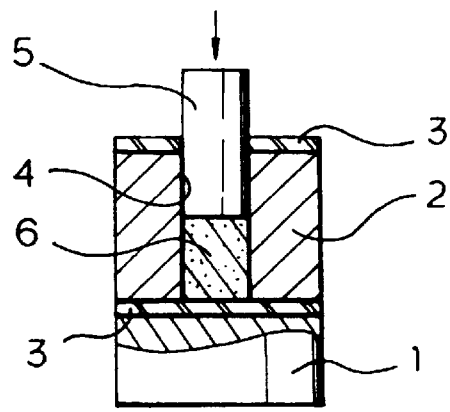
FIGS. 2b to 2d show the operation states of the apparatus: an initial pressing stage (b) ; a middle pressing stage in which water is exuded out and absorbed in a lower absorber (c); and a final pressing stage in which water is absorbed in the lower absorber and the upper absorber (d)
Figure 2C:
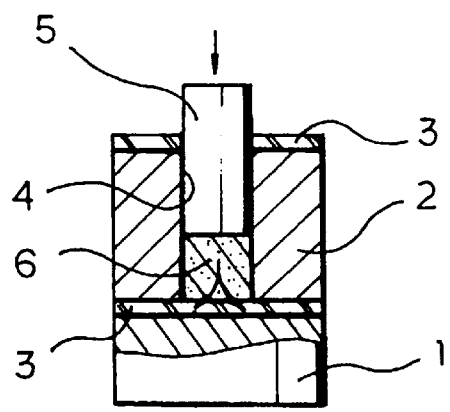
Figure 2D:
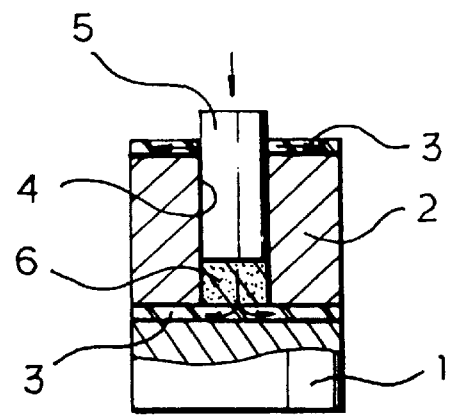

As for the ball milling and pressing, it is carried out in a uni-axial press type apparatus designed according to the present invention. Referring to FIG. 2, there are illustrated the uni-axial press type ball milling and pressing apparatus and its operation. As seen in FIG. 2a, the apparatus comprises a bottom die 1, a top mold 2 with a cavity 4, an upper punch 5, and two water absorbers 3 which act to absorb and drain the water from the slurry. One of the water absorbers 3 is placed between the bottom die 1 and the top mold 2. Then, the slurry containing the SiC particles, the inorganic binder, the organic binder, the coagulant and acetic acid is introduced in the cavity 4. Before the application of the upper punch 5, the other water absorber 3 is laid on the top mold 2. When the slurry is pressed by thrusting the upper punch 5, a primary preform 6 is formed while the water is exuded out through the gap between the bottom die 1 and the top mold 2 or absorbed in the absorber 3 therebetween, as shown in FIGS. 2b and 2c. As the pressure increases, the water may overflow partially. In this regard, the water is drained through the water absorber 3 on the top mold 2.

Figure 3A:
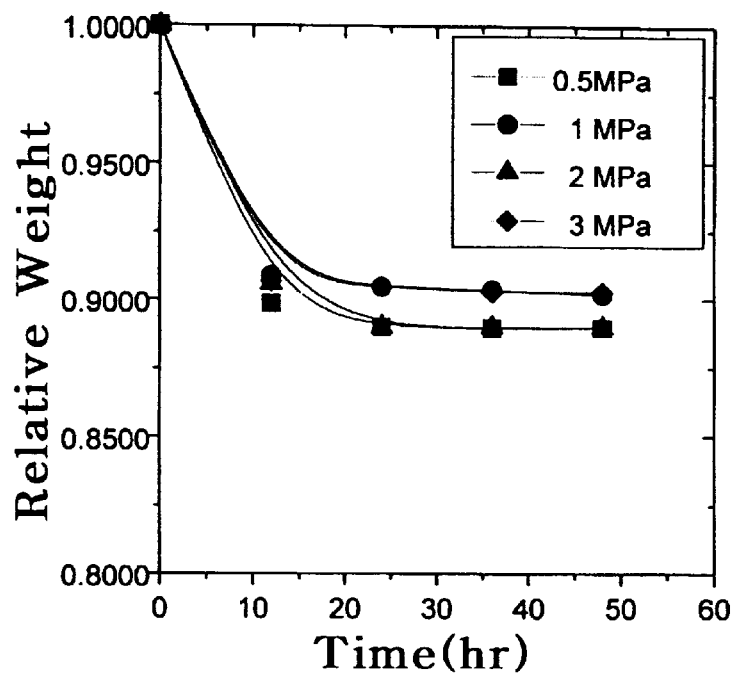
FIGS. 3a and 3b show the relative weight loss of preforms plotted against drying periods of time: when the preforms are dried naturally 3(a) and in an oven 3(b)
Figure 3B:
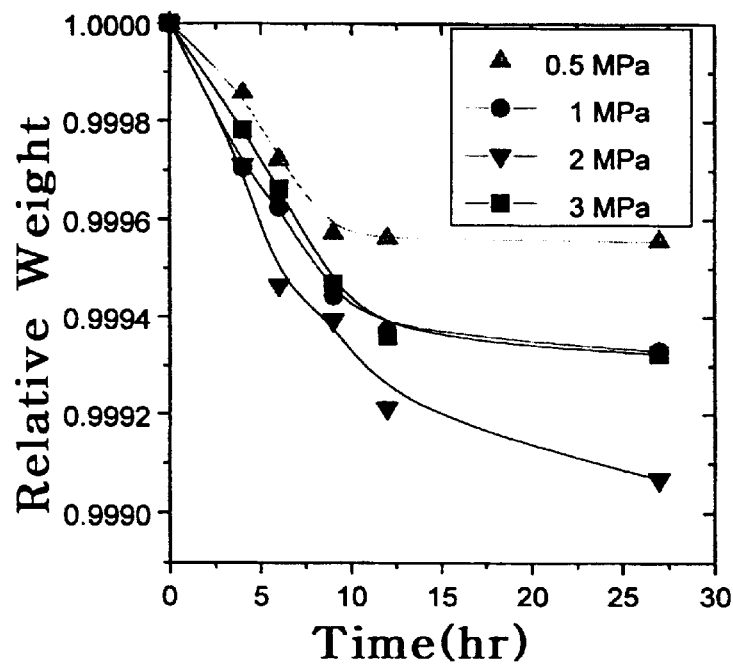

Returning to the process diagram of FIG. 1, the primary preform 6 molded is dehydrated. An insufficient dehydration of the primary preform 6 may cause defects therein upon a calcining process because the remaining water is evaporated rapidly, leading to the formation of an Al-rich layer which is locally free of the reinforcement when a composite is prepared. Therefore, it is difficult to obtain a sound composite. To cope with this problem, the primary preform is dried in two steps according to the present invention; the perform is allowed to stand for 24–48 hours at room temperature for naturally drying, followed by drying it at 100° C. for 24 hours in an oven. Referring to FIGS. 3a and 3b, the relative weight loss of the preform is plotted for the pressures of the press against the calcination period of time when drying naturally and in an oven, respectively.

Next, a calcining process is performed, according to the process flow of FIG. 1. As far as calcination condition, a temperature of 800–1,100° C. at which the inorganic binder begins to crystallize into a cristobalite, is maintained for 1–8 hours.

Figure 4A:
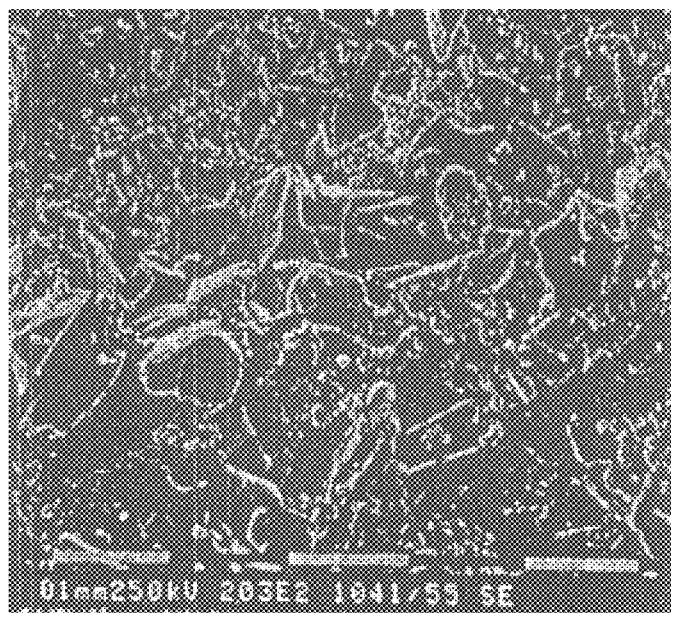
FIG. 4a is a microphotograph showing a structure of a preform which is prepared to contain SiC particles at a volume fraction of 71% by the ball milling and pressing method of the present invention.
Figure 4B:
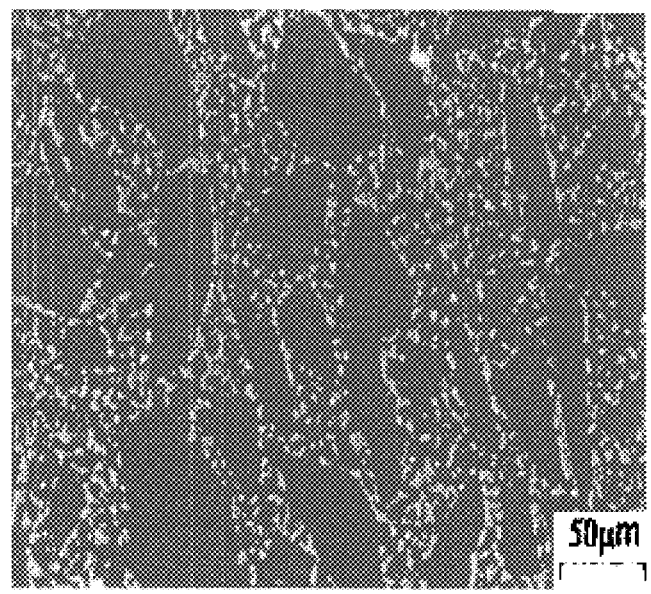
FIG. 4b is a microphotograph showing a structure of a metal matrix composite which is produced by impregnating the preform with a metal matrix.

A metal matrix composite can be attained by impregnating with a metal matrix the high volume fraction reinforcement preform prepared according to the present invention. For example, an aluminum metal is used as the matrix for the composite. The aluminum metal which is in a molten state with a temperature of 800° C., is impregnated under a pressure of 500 MPa by a squeeze casting process in which the preform is preheated to 750° C. with a temperature of a mold being 300° C. With reference to FIGS. 4a and 4b, there are shown a surface structure of the preform 6 which has a reinforcement volume fraction of 71% and a micro structure of the Al—SiC composite prepared by impregnating the preform 6 with an aluminum matrix under a pressure, respectively. As shown in the surface structure of the preform, the SiC particles which are largely divided into two different sizes are uniformly intermingled with each other. The microstructure shows that the Al—SiC composite has a density of 99% or higher and thus, the Al matrix is smoothly impregnated in the preform.

EXAMPLE

Using SiC particles in combination of an inorganic binder, an organic binder, a coagulant and/or acetic acid as indicated in Table 1, below, preforms were prepared by a vacuum assisted extraction method and the ball milling and pressing method of the invention. They were measured for the volume fractions of the SiC particles and their relative density. The results are given in Table 1.

TABLE 1

Volume % & Relative Density of Reinforcement in Preforms

| Methods | Composition | | | | | Vol % SiC | Relative Density (%) |
|---|---|---|---|---|---|---|---|
| | SiC μm | In-organic Binder | Organic Binder | Co-agulant | Acetic Acid | | |
| Vacuum assisted Extrat'n | 8 | ○ | ○ | ○ | ○ | 52 | 99.3 |
| | 48 | ○ | ○ | ○ | ○ | 49.1 | 99.2 |
| | 8 + 48 | ○ | | ○ | ○ | 54.5 | 99.3 |
| Ball Milling/ Pressing | 8 | ○ | | ○ | ○ | 59 | 99.2 |
| | 48 | ○ | ○ | ○ | ○ | 70.4 | 99.3 |
| | 8 + 48 | ○ | ○ | ○ | ○ | 71 | 99.5 |

As apparent in Table 1, when SiC particles with uniform sizes (8 or 48 μm) are used to prepare preforms by the vacuum assisted extraction method, the volume fraction of the SiC amounts up to about 50% while the ball milling and pressing method of the present invention improves the volume fraction to about 60% or higher. In addition, when two type particles with different sizes are combined, a volume fraction as high as 71% can be provided for the preform by the ball milling and pressing method of the present invention.

Application Example

Preforms prepared by the vacuum assisted extraction method and the ball milling and pressing method were impregnated with an aluminum matrix to produce metal matrix composites which were then measured for thermal conductivity and coefficient of thermal expansion. The measurements are given, together with theoretical values, in Table 2, below.

The data of Table 2 demonstrate that, as the volume fraction of the reinforcement increases, the measured coefficients of thermal expansion of the metal matrix composites are more approximate to the theoretical values while the measured values for the thermal conductivity are deviated further from the calculated values. The metal matrix composite with a reinforcement volume fraction of 70% or higher, prepared by the ball milling and pressing method according to the present invention, was found to be 130 W/mK or higher in thermal conductivity and $7 \times 10^{-6}$/K or lower in coefficient of thermal expansion. Therefore, the preforms prepared by the ball milling and pressing method of the present invention are useful to produce the metal matrix composites which are of high availability for the application requiring high thermal conduction and low thermal expansion.

TABLE 2

Coefficient of Thermal Expansion & Thermal Conductivity

| Process | Vol % SiC | Coeffi. Expansion ($10^{-6}$/K.) | | Thermal Conductivity (W/m K.) | |
| --- | --- | --- | --- | --- | --- |
| | | Measured | Calculated | Measured | Calculated |
| Vacuum assisted Extrat'n | 49.1 | 9.5 | 9.1 | 180 | 174.7 |
| | 54.5 | 8.3 | 8.4 | 172 | 166 |
| Ball Milling/ Pressing | 59 | 7.4 | 7.9 | 172 | 162 |
| | 71 | 6.8 | 6.8 | 131 | 145 |

As described hereinbefore, the preforms prepared by the method of the present invention contain reinforcements at high volume fractions, e.g. 70 vol % or higher, and can be easily impregnated with metal matrixes. Thus, the preforms can be used as fundamental materials in producing metal matrix composites having a high thermal conductivity and a low coefficient of thermal expansion, suitable for the application for, e.g., electronic packaging and space-air structures. Because such metal matrix composites are expected to be widely applied for various fields, the preforms with a high volume fraction of reinforcements, prepared by the present invention, are of high industrial value.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A process for preparing a preform with a high volume fraction of SiC particles by use of an apparatus comprising:

a bottom die;

a top mold with a cavity, placed on the bottom die;

an upper punch for pressing a material for said preform in said cavity;

and two water-absorbers, one being inserted between said bottom die and said-top mold, the other being placed on the top mold, wherein a slurry prepared by mixing SiC particles with binders in deionized water and ball milling the mixture, is introduced in said cavity and pressed by said punch while the water is absorbed in said absorbers or drained through a gap between said bottom die and said mold;

said process comprising the steps of:

mixing SiC particles with an inorganic binder, an organic binder and a coagulant in distilled water and ball milling the resulting suspension to give a slurry;

pressing the slurry in said apparatus to give a primary preform;

drying said primary preform; and calcining said primary preform.

2. A process as set forth in claim 1, wherein said suspension comprises 0.1–10% of $SiO_2$ as the inorganic binder, 0.1–5% of cationic starch as the organic binder and 0.1–5% of polyacrylamide as the coagulant, and ranges, in pH, from 2 to 4.

3. A process as set forth in claim 1, wherein said SiC particles are a combination of two type particles which are different in particle size by 3–16 fold, said ball milling step is carried out for 4–24 hours, and said pressing step is performed at a pressure of 0.50–3,00 MPa, whereby said preform can contain said SiC particles at a volume fraction of 60% or higher.

4. A process as set forth in claim 1, wherein said drying step is carried out at room temperature for 24–48 hours and at 100° C. for 4–24 hours and said calcining step is carried out at 800–1,100° C. for 1–8 hours.

* * * * *